United States Patent
Wu et al.

(10) Patent No.: US 10,087,106 B2
(45) Date of Patent: *Oct. 2, 2018

(54) METHOD OF CONSTRUCTING AN AXIAL COMPRESSION STEEL TUBULAR COLUMN

(71) Applicant: SOUTH CHINA UNIVERSITY OF TECHNOLOGY, Guangdong (CN)

(72) Inventors: Bo Wu, Guangdong (CN); Qiang Zhang, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/512,068

(22) PCT Filed: Oct. 24, 2014

(86) PCT No.: PCT/CN2014/089375
§ 371 (c)(1),
(2) Date: Mar. 17, 2017

(87) PCT Pub. No.: WO2016/041236
PCT Pub. Date: Mar. 24, 2016

(65) Prior Publication Data
US 2017/0253526 A1    Sep. 7, 2017

(30) Foreign Application Priority Data

Sep. 17, 2014 (CN) .......................... 2014 1 0476627

(51) Int. Cl.
  *C04B 18/16*    (2006.01)
  *E04C 3/34*    (2006.01)
  (Continued)

(52) U.S. Cl.
  CPC ............ *C04B 18/167* (2013.01); *C04B 28/02* (2013.01); *E04C 3/34* (2013.01); *E04C 3/36* (2013.01);
  (Continued)

(58) Field of Classification Search
  CPC ....... C04B 18/04; C04B 18/167; C04B 28/02; E04C 3/30; E04C 3/34; E04C 3/36; Y02W 30/95
  See application file for complete search history.

(56) References Cited

U.S. PATENT DOCUMENTS 3,316,724 A * 5/1967 Tsuzuki .................. E02D 5/523
                                                  405/251
3,578,036 A * 5/1971 Francois ............... B21F 27/127
                                                  138/109

(Continued)

FOREIGN PATENT DOCUMENTS

CN    101054275         10/2007
CN    101418629 A  *   4/2009
(Continued)

OTHER PUBLICATIONS

Abstract in English of CN 101418629 A.*
"International Search Report (Form PCT/ISA/210)", dated Oct. 30, 2015, with English translation thereof, pp. 1-5.

*Primary Examiner* — James M Ference
(74) *Attorney, Agent, or Firm* — JCIPRNET

(57) ABSTRACT

An axial compression steel tubular column with internal local restraint and filled with high-strength compound concrete containing normal-strength demolished concrete lumps and a construction process. The axial compression column includes a steel tube (1), high-strength fresh concrete (2), normal-strength demolished concrete lumps (3), a spiral stirrup (4), and longitudinal erection bars (6). The spiral stirrup (4) is arranged at a middle part inside the steel tube (Continued)

(1). The high-strength fresh concrete (2) is poured and the normal-strength demolished concrete lumps (3) are put alternately inside the steel tube (1). A compressive strength of the high-strength fresh concrete (2) is 30~90 MPa greater than that of the normal-strength demolished concrete lumps (3).

2 Claims, 3 Drawing Sheets

(51) Int. Cl.
    *E04C 3/36* (2006.01)
    *C04B 28/02* (2006.01)
    *C04B 18/04* (2006.01)
    *E04C 3/30* (2006.01)

(52) U.S. Cl.
    CPC ............. *C04B 18/04* (2013.01); *E04C 3/30* (2013.01); *Y02W 30/95* (2015.05)

(56) References Cited

U.S. PATENT DOCUMENTS

| | | | | |
|---|---|---|---|---|
| 3,858,374 A * | 1/1975 | Ben-Zvi | E04C 3/26 | 52/2.11 |
| 4,018,055 A * | 4/1977 | Le Clercq | E02D 5/30 | 405/257 |
| 4,127,002 A * | 11/1978 | DeWitt | E02D 5/50 | 405/239 |
| 4,166,347 A * | 9/1979 | Pohlman | E04C 3/34 | 52/223.4 |
| 4,571,124 A * | 2/1986 | Matsui | E02D 9/005 | 405/234 |
| 4,606,167 A * | 8/1986 | Thorne | E04B 1/944 | 52/364 |
| 4,722,156 A * | 2/1988 | Sato | E04C 3/34 | 52/834 |
| 4,783,940 A * | 11/1988 | Sato | E04B 1/2403 | 264/228 |
| 4,864,797 A * | 9/1989 | Sato | E02D 5/30 | 264/256 |
| 5,012,622 A * | 5/1991 | Sato | E02D 5/30 | 52/263 |
| 5,050,356 A * | 9/1991 | Johnson | E04H 12/22 | 405/239 |
| 5,119,614 A * | 6/1992 | Rex | E04C 5/0604 | 52/649.3 |
| 5,263,297 A * | 11/1993 | Kim | E04C 3/34 | 52/244 |
| 5,317,846 A * | 6/1994 | Michlovic | E04B 5/40 | 52/220.2 |
| 5,328,508 A * | 7/1994 | Lin | C04B 40/024 | 106/672 |
| 5,367,854 A * | 11/1994 | Kim | E04G 21/06 | 264/426 |
| 5,457,929 A * | 10/1995 | Kim | E04C 3/34 | 52/244 |
| 5,599,599 A * | 2/1997 | Mirmiran | B29C 70/865 | 428/120 |
| 5,766,524 A * | 6/1998 | Rashwan | B28B 1/004 | 264/140 |
| 5,809,712 A * | 9/1998 | Simanjuntak | E04C 5/08 | 52/223.7 |
| 6,123,485 A * | 9/2000 | Mirmiran | E02D 31/02 | 405/232 |
| 6,192,647 B1 * | 2/2001 | Dahl | E04C 3/34 | 403/300 |
| 6,244,014 B1 * | 6/2001 | Barmakian | B29C 45/14549 | 52/834 |
| 6,293,071 B1 * | 9/2001 | Konstantinidis | E04C 5/02 | 52/659 |
| 6,350,304 B1 * | 2/2002 | Tozaka | A01M 1/245 | 106/15.05 |
| 6,705,058 B1 * | 3/2004 | Foust | E04C 3/32 | 52/296 |
| 8,104,242 B1 * | 1/2012 | Fouad | E04C 3/34 | 52/223.14 |
| 8,484,915 B1 * | 7/2013 | Abbas | E04C 3/34 | 405/232 |
| 9,518,388 B1 * | 12/2016 | Wang | E04B 1/161 | |
| 2003/0089063 A1 * | 5/2003 | Igarashi | E04G 23/0218 | 52/405.2 |
| 2004/0028840 A1 * | 2/2004 | Yamamoto | C04B 18/16 | 428/15 |
| 2004/0107876 A1 * | 6/2004 | Tomita | C04B 24/2647 | 106/808 |
| 2004/0154263 A1 * | 8/2004 | Li | E04C 3/34 | 52/831 |
| 2004/0231278 A1 * | 11/2004 | Yin | E04C 5/0618 | 52/649.4 |
| 2005/0050837 A1 * | 3/2005 | Wang | E04B 5/43 | 52/600 |
| 2005/0055922 A1 * | 3/2005 | Shamsai | E04C 3/34 | 52/319 |
| 2005/0097855 A1 * | 5/2005 | Fouad | E04H 12/12 | 52/843 |
| 2005/0183381 A1 * | 8/2005 | Rosenberg | C04B 28/02 | 52/649.3 |
| 2006/0207211 A1 * | 9/2006 | Yin | E04C 3/34 | 52/837 |
| 2008/0155827 A1 * | 7/2008 | Fyfe | E04G 23/0218 | 29/897.1 |
| 2008/0184667 A1 * | 8/2008 | Hindi | E04C 5/0618 | 52/831 |
| 2008/0263978 A1 * | 10/2008 | Abou-Saleh | E04C 5/06 | 52/260 |
| 2010/0071315 A1 * | 3/2010 | Hong | E04B 1/215 | 52/848 |
| 2011/0047928 A1 * | 3/2011 | Aburto | E04B 1/161 | 52/745.05 |
| 2011/0138704 A1 * | 6/2011 | Bagepalli | E04H 12/12 | 52/147 |
| 2011/0138707 A1 * | 6/2011 | Bagepalli | E02D 27/42 | 52/173.1 |
| 2012/0047816 A1 * | 3/2012 | Zhong | E04B 1/161 | 52/11 |
| 2012/0233936 A1 * | 9/2012 | Zhong | E04B 1/165 | 52/173.1 |
| 2013/0104492 A1 * | 5/2013 | Hung | E04B 5/38 | 52/664 |
| 2013/0186016 A1 * | 7/2013 | McCue | E04H 1/1205 | 52/173.1 |
| 2013/0312350 A1 * | 11/2013 | Kreizinger | E04G 11/00 | 52/426 |
| 2014/0068946 A1 * | 3/2014 | Kim | E04C 5/012 | 29/897.34 |
| 2015/0075110 A1 * | 3/2015 | Golledge | E04C 5/167 | 52/688 |
| 2015/0354238 A1 * | 12/2015 | Abbasi | E04G 23/0218 | 52/514.5 |

FOREIGN PATENT DOCUMENTS

| | | |
|---|---|---|
| CN | 101818543 | 9/2010 |
| CN | 201883609 | 6/2011 |
| CN | 202324344 | 7/2012 |
| DE | 2524147 | 12/1976 |
| JP | H07279312 | 10/1995 |
| JP | 2001233657 | 8/2001 |

* cited by examiner

US 10,087,106 B2

METHOD OF CONSTRUCTING AN AXIAL COMPRESSION STEEL TUBULAR COLUMN

CROSS-REFERENCE TO RELATED APPLICATION

This application is a 371 application of an international PCT application serial no. PCT/CN2014/089375, filed on Oct. 24, 2014, which claims priority to and the benefit of China Patent Application No. CN201410476627.4, filed on Sep. 17, 2014, the disclosures of which are incorporated herein by reference in its entirety.

TECHNICAL FIELD

The present invention relates to the technical field of cyclic utilization of waste concrete and in particular, to an axial compression steel tubular column with internal local restraint and filled with high-strength compound concrete containing normal-strength demolished concrete lumps and a construction process of such column.

BACKGROUND

Compared with conventional steel reinforced concrete column, concrete-filled steel tubular column has advantages such as saving template, high construction speed and high carrying capacity, and has been widely used in the field of civil engineering and construction at home and abroad. However, a large number of experiments found that, axial compressive failure of the concrete-filled steel tubular column is mainly manifested as waist bloating shape failure mode that it is seriously bloated close to a half high of a column shaft, while transverse deformation of upper and lower ends of the column shaft is less obvious. At this time, steel materials at the upper and lower ends of the column shaft have not actually gotten into full play to the role of horizontal restraint. Therefore, in the case of amount of steel remains the same, the concrete-filled steel tubular column may be further optimized by adjusting material layout (i.e. increasing the proportion of steel consumed close to the half high of the column shaft, while decreasing the proportion of steel consumed to the upper and lower ends of the column shaft), and thereby its axial compression performance is improved, but such technology is rarely seen by now.

Since natural sand and gravel mining destroys the environment, and directly transporting waste concrete produced by demolishing existing buildings and structures towards a suburb for stacking or burying will lead to a new environment problem, recycle use of the waste concrete has attracted more and more attention at home and abroad. In general, since the construction of waste concrete is earlier, and strength grade is generally low, in the past the waste concrete was only used with fresh concrete with close strength grade, with range of application being subjected to great restraints (for example, cannot be directly applied to high-level, heavy load and other structures), so how to effectively expand the range of application of normal-strength demolished concrete is an urgent problem to be solved.

To sum up, problems exist in the prior arts, such as material layout of the axial compression concrete-filled steel tubular column being not reasonable enough and the range of application of the normal-strength demolished concrete being urgent to expand.

SUMMARY OF THE INVENTION

The object of the present invention is to overcome the deficiencies of the prior arts, providing an axial compression steel tubular column with internal local restraint and filled with high-strength compound concrete containing normal-strength demolished concrete lumps and, a construction process. On one hand, by means of appropriately reducing steel tube wall thickness of the concrete-filled steel tubular column, while strengthening a horizontal restraint close to a half high of a column shaft, axial compression performance of the column is significantly improved in the case of same amount of steel; on the other hand, by means of using a mixture of normal-strength demolished concrete lumps and high-strength fresh concrete, the former may be applied to a member or structure requiring higher concrete strength, and thereby range of application of the normal-strength demolished concrete is greatly expanded.

The technical solution adopted in the present invention to achieve the above mentioned object is as follows:

An axial compression steel tubular column with internal local restraint and filled with high-strength compound concrete containing normal-strength demolished concrete lumps, a spiral stirrup or a plurality of horizontal stirrups are provided in three-fifths of a height range at a middle part in a steel tube. High-strength fresh concrete is poured and normal-strength demolished concrete lumps are put alternately inside the steel tube, with a compressive strength of the high-strength fresh concrete being 30-90 MPa greater than that of the normal-strength demolished concrete.

Further optimized for implementation, the spiral stirrup is arranged in three-fifths of a height range at a middle part in a steel tube, with a section of the steel tube being circular; or the horizontal stirrups are arranged in three-fifths of a height range at the middle part in the steel tube, which are dense in the middle and sparse on both sides, with a section of the steel tube being circular or polygonal.

Further optimized for implementation, the normal-strength demolished concrete lumps are waste concrete lumps after demolishing old buildings, structures, roads, bridges or dams and removing protective layers and all or part of steel reinforcements.

Further optimized for implementation, the high-strength fresh concrete is a natural aggregate concrete or a recycled aggregate concrete, and has a compressive strength no less than 60 MPa.

Further optimized for implementation, the normal-strength demolished concrete lump has a characteristic size no less than 100 mm, and a mass ratio of the normal-strength demolished concrete lump and the high-strength fresh concrete is 1:4-1:1.

A construction process of the above described axial compression steel tubular column with internal local restraint and filled with high-strength compound concrete containing normal-strength demolished concrete lumps, which comprises following steps:

(1) spot welding a spiral stirrup or a plurality of horizontal stirrups and two longitudinal erection bars into one, then lifting the two longitudinal erection bars, arranging the spiral stirrup or the plurality of horizontal stirrups in three-fifths of a height range at a middle part in a steel tube, with a stirrup distance being that the stirrups are dense in the middle and sparse on both sides when horizontal stirrup is adopted, then spot welding the two longitudinal erection bars with an inner wall of the steel tube;

(2) fully wetting normal-strength demolished concrete lumps in advance, when putting, pouring high-strength fresh concrete with about 20 mm thickness into a bottom of the steel tube first, then alternately putting wet normal-strength demolished concrete lumps and the high-strength fresh concrete inside the steel tube and fully vibrating until pouring is finished, so that the normal-strength demolished concrete lumps and the high-strength fresh concrete are uniformly mixed into one.

Compared with the prior arts, the present invention has following advantages:

(1) By means of arranging a spiral stirrup or a plurality of horizontal stirrups at a middle part in a steel tube, which further strengthens horizontal restraint at the middle part of a concrete-filled steel tubular column, axial compression performance of the concrete-filled steel tubular column is significantly improved in the case of same amount of steel.

(2) Utilizing normal-strength demolished concrete lumps and high-strength fresh concrete to produce a steel tubular column filled with high-strength compound concrete containing normal-strength demolished concrete lumps may apply the normal-strength demolished concrete to a member or structure requiring higher concrete strength, which expands range of application of the normal-strength demolished concrete.

(3) Using the demolished concrete lumps for pouring greatly simplifies treating processes such as crushing, screening and purifying during cyclic utilization of the waste concrete, which saves a large amount of manpower, time and energy, and may realize effective cyclic utilization of the waste concrete.

DETAILED DESCRIPTION OF THE PREFERRED EMBODIMENT

The present invention is further described in detail below in combination with embodiments and accompanying drawings, but implementations of the present invention are not limited thereto.

Embodiment 1

Figure 1A:
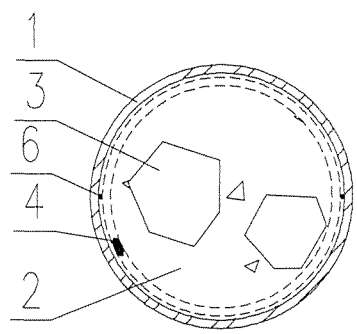
FIG. 1a and FIG. 1b are schematic views of transverse section and longitudinal section of the axial compression steel tubular column with internal local restraint and filled with high-strength compound concrete containing normal-strength demolished concrete lumps according to Embodiment 1, respectively.
Figure 1B:
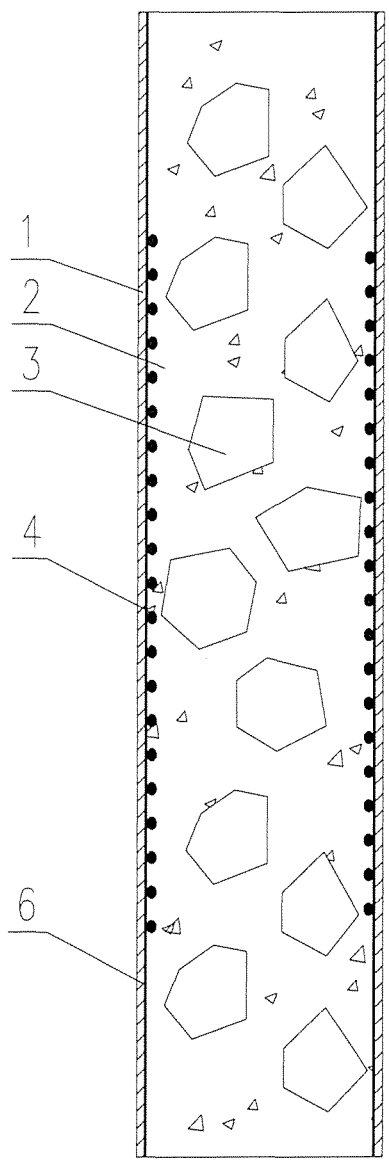

See FIG. 1a and FIG. 1b, an axial compression steel tubular column with internal local restraint and filled with high-strength compound concrete containing normal-strength demolished concrete lumps according to the present invention comprising a steel tube 1, high-strength fresh concrete 2, normal-strength demolished concrete lumps 3, a spiral stirrup 4, and longitudinal erection bars 6. The steel tube has a circular section, with an outer diameter of 300 mm, a wall thickness of 6 mm, a steel tube length of 3000 mm, designation of steel of Q235, measured yield strength of 269.8 MPa, and a tensile strength of 407.7 MPa. Fresh concrete with a strength grade of 70 MPa is poured and demolished concrete lumps with a strength grade of 30 MPa are put alternately inside the steel tube. A compressive strength of the high-strength fresh concrete is 40 MPa greater than that of the normal-strength demolished concrete. After the high-strength fresh concrete is combined with normal-strength demolished concrete, the compressive strength is 48.8 MPa. The spiral stirrup is uniformly arranged in three-fifths of a height range at a middle part in the steel tube. The spiral stirrup adopts HRB335-grade steel reinforcement with a diameter of 12 mm, having a total length of 21250 mm. The longitudinal erection bar adopts HRB335-grade steel reinforcement with a diameter of 8 mm, having a length of 3000 mm. The normal-strength demolished concrete lumps are waste concrete lumps after demolishing an old building and removing protective layers and all steel reinforcements. The high-strength fresh concrete is a natural aggregate concrete. The normal-strength demolished concrete lump has a characteristic size of 100-200 mm, and a mass ratio of the normal-strength demolished concrete lump and the high-strength fresh concrete is 1:1.5.

A construction process of the above described axial compression steel tubular column with internal local restraint and filled with high-strength compound concrete containing normal-strength demolished concrete lumps, which comprises following steps:

(1) spot welding a spiral stirrup and two longitudinal erection bars into one, then lifting the two longitudinal erection bars, uniformly arranging the spiral stirrup in three-fifths of a height range at a middle part of a steel tube, then spot welding the two longitudinal erection bars with an inner wall of the steel tube;

(2) fully wetting normal-strength demolished concrete lumps in advance, when putting, pouring high-strength fresh concrete with about 20 mm thickness into a bottom of the steel tube first, then alternately putting wet normal-strength demolished concrete lumps and the high-strength fresh concrete inside the steel tube and fully vibrating until pouring is finished, so that the normal-strength demolished concrete lumps and the high-strength fresh concrete are uniformly mixed into one.

For the purpose of comparison, a circular steel tube with an outer diameter of 300 mm, a wall thickness of 7 mm, a length of 3000 mm and same materials is taken, without arranging spiral stirrup, to produce a steel tubular column without local restraint and filled with high-strength compound concrete containing normal strength demolished concrete lumps. Fresh concrete with a strength grade of 35 MPa and waste concrete lumps with a strength grade of 30 MPa are taken at the same time, with a compressive strength after mixing being 33 MPa, to produce a steel tubular column without local restraint filled with conventional compound concrete containing demolished concrete lumps. It is found that the axial compression steel tubular column with internal local restraint and filled with high-strength compound concrete containing normal-strength demolished concrete lumps in the present embodiment has an ultimate axial compression bearing capacity of 5956 kN, while the steel tubular column without local restraint and filled with high-strength compound concrete containing normal-strength demolished concrete lumps has an ultimate axial compression bearing capacity of about 5113 kN, and the steel tubular column without local restraint and filled with compound concrete containing demolished concrete lumps has an ultimate axial compression bearing capacity of 4328 kN. By calculating, it can be seen that amount of steel of the above three columns is almost the same, but axial compression bearing capacity of the former is 16.5% higher than the middle, axial compression bearing capacity of the middle is 18.1% higher than the latter, and axial compression bearing capacity of the former is 37.6% higher than the latter.

Embodiment 2

Figure 2A:
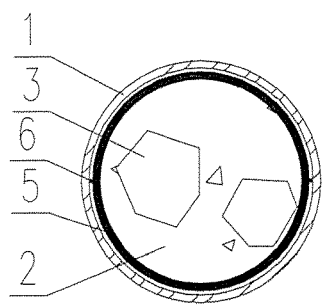
FIG. 2a and FIG. 2b are schematic views of transverse section and longitudinal section of the axial compression steel tubular column with internal local restraint and filled with high-strength compound concrete containing normal-strength demolished concrete lumps according to Embodiment 2, respectively.
Figure 2B:
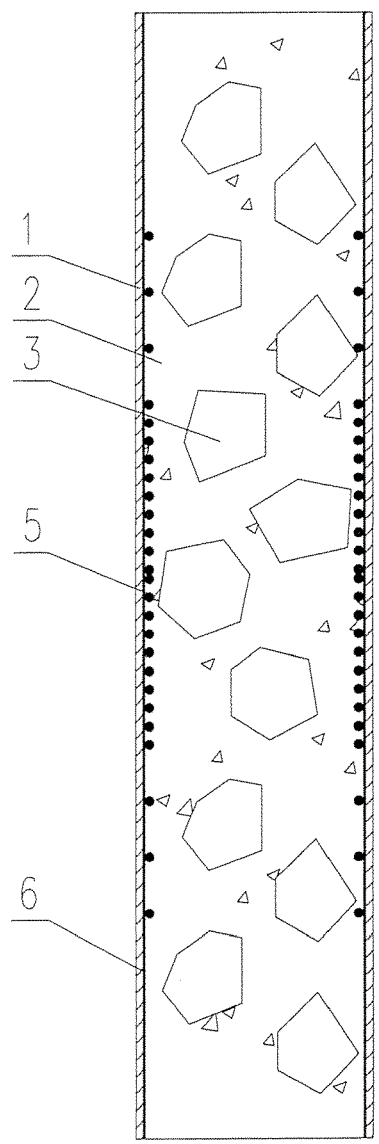

See FIG. 2a and FIG. 2b, an axial compression steel tubular column with internal local restraint and filled with high-strength compound concrete containing normal-strength demolished concrete lumps according to the present invention comprising a steel tube 1, high-strength fresh concrete 2, normal-strength demolished concrete lumps 3, horizontal stirrups 5, and longitudinal erection bars 6. The steel tube has a circular section, with an outer diameter of 300 mm, a wall thickness of 6 mm, a steel tube length of 3000 mm, designation of steel of Q235, measured yield strength of 269.8 MPa, and a tensile strength of 407.7 MPa. Fresh concrete with a strength grade of 70 MPa is poured and demolished concrete lumps with a strength grade of 30 MPa are put alternately inside the steel tube. A compressive strength of the high-strength fresh concrete is 40 MPa greater than that of the normal-strength demolished concrete. After the high-strength fresh concrete is combined with normal-strength demolished concrete, the compressive strength is 48.8 MPa. 26 horizontal stirrups are arranged in three-fifths of a height range at a middle part in the steel tube, and the horizontal stirrup adopts HRB335-grade steel reinforcement with a diameter of 12 mm. In particular, two stirrups are arranged close together at a height of 1500 mm, a total of 20 stirrups are arranged in a height range of 900 mm in the middle, with a stirrup distance of 49 mm; another 3 stirrups are arranged at both sides, with a stirrup distance of 150 mm. The longitudinal erection bar adopts HRB335-grade steel reinforcement with a diameter of 8 mm, having a length of 3000 mm. The normal-strength demolished concrete lumps are waste concrete lumps after demolishing an old building and removing protective layers and all steel reinforcements. The high-strength fresh concrete is a natural aggregate concrete. The normal-strength demolished concrete lump has a characteristic size of 100-200 mm, and a mass ratio of the normal-strength demolished concrete lump and the high-strength fresh concrete is 1:1.5.

A construction process of the above described axial compression steel tubular column with internal local restraint and filled with high-strength compound concrete containing normal-strength demolished concrete lumps, which comprises following steps:

(1) spot welding 26 horizontal stirrups and two longitudinal erection bars into one, then lifting the two longitudinal erection bars, arranging the horizontal stirrups in three-fifths of a height range at a middle part of a steel tube, wherein two stirrups are arranged close together at a height of 1500 mm, a total of 20 stirrups are arranged in a height range of 900 mm in the middle, with a stirrup distance of 49 mm, and another 3 stirrups are arranged at both sides, with a stirrup distance of 150 mm; then spot welding the two longitudinal erection bars with an inner wall of the steel tube;

(2) fully wetting normal-strength demolished concrete lumps in advance, when putting, pouring high-strength fresh concrete with about 20 mm thickness into a bottom of the steel tube first, then alternately putting wet normal-strength demolished concrete lumps and the high-strength fresh concrete inside the steel tube and fully vibrating until pouring is finished, so that the normal-strength demolished concrete lumps and the high-strength fresh concrete are uniformly mixed into one.

For the purpose of comparison, a circular steel tube with an outer diameter of 300 mm, a wall thickness of 7 mm, a length of 3000 mm and same materials is taken, without arranging horizontal stirrup, to produce a steel tubular column without local restraint and filled with high-strength compound concrete containing normal-strength demolished concrete lumps. Fresh concrete with a strength grade of 35 MPa and demolished concrete lumps with a strength grade of 30 MPa are taken at the same time, with a compressive strength after mixing being 33 MPa, to produce a steel tubular column without local restraint and filled with conventional compound concrete containing demolished concrete lumps. It is found that the axial compression steel tubular column with internal local restraint and filled with high-strength compound concrete containing normal-strength demolished concrete lumps in the present embodiment has an ultimate axial compression bearing capacity of 5783 kN, the steel tubular column without local restraint and filled with high-strength compound concrete containing normal-strength demolished concrete lumps has an ultimate axial compression bearing capacity of about 5113 kN, and the conventional steel tubular column without local restraint and filled with conventional compound concrete containing demolished concrete lumps has an ultimate axial compression bearing capacity of 4328 kN. By calculating, it can be seen that amount of steel of the above three columns is almost the same, but axial compression bearing capacity of the former is 13.1% higher than the middle, axial compression bearing capacity of the middle is 18.1% higher than the latter, and axial compression bearing capacity of the former is 36.6% higher than the latter.

Embodiment 3

Figure 3A:
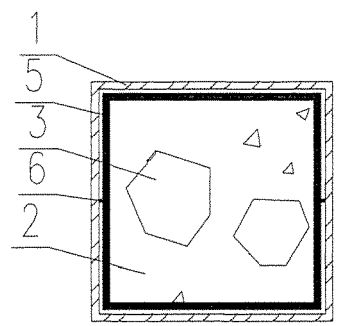
FIG. 3a and FIG. 3b are schematic views of transverse section and longitudinal section of the axial compression steel tubular column with internal local restraint and filled with high-strength compound concrete containing normal-strength demolished concrete lumps according to Embodiment 3, respectively.
Figure 3B:
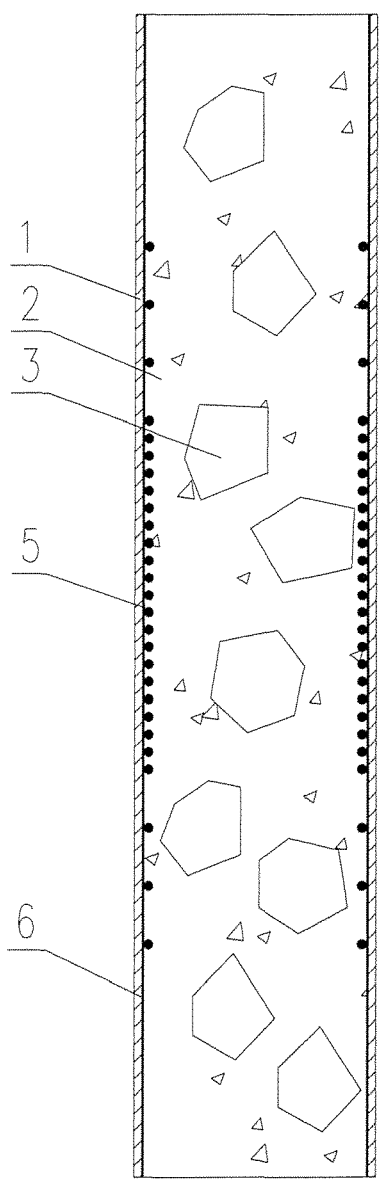

See FIG. 3a and FIG. 3b, an axial compression steel tubular column with internal local restraint and filled with high-strength compound concrete containing normal-strength demolished concrete lumps according to the present invention comprising a steel tube 1, high-strength fresh concrete 2, normal-strength demolished concrete lumps 3, horizontal stirrup 5, and longitudinal erection bars 6. The steel tube has a rectangular section, with a side length of 300 mm, a wall thickness of 7 mm, a steel tube length of 3000 mm, designation of steel of Q235, measured yield strength of 269.8 MPa, and a tensile strength of 407.7 MPa. Fresh concrete with a strength grade of 110 MPa and demolished concrete lumps with a strength grade of 20 MPa are poured alternately inside the steel tube. A compressive strength of the high-strength fresh concrete is 90 MPa greater than that of the normal-strength demolished concrete. After the high-strength fresh concrete is combined with normal-strength demolished concrete, the compressive strength is 57.5 MPa. 27 horizontal stirrups are arranged in three-fifths of a height range at a middle part in the steel tube. The stirrup adopts HRB335-grade steel reinforcement with a diameter of 12 mm. In particular, 21 stirrups are arranged in the middle, with a stirrup distance 45 mm, and another 3 stirrups are arranged at both sides, with a stirrup distance 150 mm. The longitudinal erection bar adopts HRB335-grade steel reinforcement with a diameter of 8 mm, having a length of 3000 mm. The normal-strength demolished concrete lumps are waste concrete lumps after demolishing an old building and removing protective layers and all steel reinforcements. The high-strength fresh concrete is a natural aggregate concrete.

The normal-strength demolished concrete lump has a characteristic size of 100-200 mm, and a mass ratio of the normal-strength demolished concrete lump and the high-strength fresh concrete is 1:2.

A construction process of the above described axial compression steel tubular column with internal local restraint and filled with high-strength compound concrete containing normal-strength demolished concrete lumps, which comprises following steps:

(1) spot welding 27 horizontal stirrups and two longitudinal erection bars into one, then lifting the two longitudinal erection bars, arranging the horizontal stirrup in three-fifths of a height range at a middle part in a steel tube, wherein a total of 21 stirrups are arranged in a height range of 900 mm in the middle, with a stirrup distance of 45 mm, and another 3 stirrups are arranged at both sides, with a stirrup distance 150 mm; then spot welding the two longitudinal erection bars with an inner wall of the steel tube;

(2) fully wetting normal-strength demolished concrete lumps in advance, when putting, pouring high-strength fresh concrete with about 20 mm thickness into a bottom of the steel tube first, then alternately putting wet normal-strength demolished concrete lumps and the high-strength fresh concrete inside the steel tube and fully vibrating until pouring is finished, so that the normal-strength demolished concrete lumps and the high-strength fresh concrete are uniformly mixed into one.

For the purpose of comparison, a rectangular steel tube with a side length of 300 mm, a wall thickness of 8 mm, a length of 3000 mm and same materials is taken, without arranging horizontal stirrup, to produce a steel tubular column without local restraint and filled with high-strength compound concrete containing normal-strength demolished concrete lumps. Fresh concrete of a strength grade of 30 MPa and demolished concrete lumps with a strength grade of 20 MPa are taken at the same time, with a compressive strength after mixing being 26.7 MPa, to produce a steel tubular column without local restraint and filled with conventional compound concrete containing demolished concrete lumps. It is found that the axial compression steel tubular column with internal local restraint and filled with high-strength compound concrete containing normal-strength demolished concrete lumps in the present embodiment has an ultimate axial compression bearing capacity of about 8802 kN, the steel tubular column without local restraint and filled with high-strength compound concrete containing normal-strength demolished concrete lumps has an ultimate axial compression bearing capacity of about 8081 kN, and the steel tubular column without local restraint and filled with conventional compound concrete containing demolished concrete lumps has an ultimate axial compression bearing capacity of about 5607 kN. By calculating, it can be seen that amount of steel of the above three columns is almost the same, but axial compression bearing capacity of the former is 8.9% higher than the middle, axial compression bearing capacity of the middle is 44.1% higher than the latter, and axial compression bearing capacity of the former is 57.0% higher than the latter.

The above are preferred implementations of the present invention, but the implementations of the present invention are not limited by the above content. Any other changes, modifications, substitutions, combinations and simplifications that are not deviated from the spirit and principles of the present invention should be equivalent replacements, which are included within the scope of protection of the present invention.

What is claimed is:

1. A method of constructing an axial compression steel tubular column with an internal local restraint and filled with high-strength compound concrete containing demolished concrete lumps, the method comprising:
    (1) spot welding a spiral stirrup to two longitudinal erection bars to form one unit, then lifting the two longitudinal erection bars together with the spiral stirrup, arranging the spiral stirrup at a middle part of a steel tube, wherein the middle part of the steel tube is centered at a midpoint of a length of the steel tube and a length of the middle part of the steel tube is three-fifths of the length of the steel tube, and then spot welding the two longitudinal erection bars with an inner wall of the steel tube;
    (2) wetting the demolished concrete lumps before putting the demolished concrete lumps inside the steel tube, pouring high-strength fresh concrete into a bottom of the steel tube, wherein the high-strength fresh concrete has a 20 mm thickness in the bottom of the steel tube after being poured into the steel tube, and then alternately putting the wet demolished concrete lumps and pouring the high-strength fresh concrete into the steel tube, and vibrating the demolished concrete lumps and the high-strength fresh concrete in the steel tube until the steel tube is filled, so that demolished concrete lumps are distributed in the high-strength fresh concrete.

2. A method of constructing an axial compression steel tubular column with an internal local restraint and filled with high-strength compound concrete containing demolished concrete lumps, the method comprising:
    (1) spot welding a plurality of horizontal stirrups to two longitudinal erection bars to form one unit, then lifting the two longitudinal erection bars together with the plurality of horizontal stirrups, arranging the plurality of horizontal stirrups at a middle part of a steel tube, wherein the middle part of the steel tube is centered at a midpoint of a length of the steel tube and a length of the middle part of the steel tube is three-fifths of the length of the steel tube, with a horizontal stirrup spacing between each of the plurality of horizontal stirrups being greater at end portions of the middle part of the steel tube with respect to an inner portion of the middle part of the steel tube, and then spot welding the two longitudinal erection bars with an inner wall of the steel tube;
    (2) wetting the demolished concrete lumps before putting the demolished concrete lumps inside the steel tube, pouring high-strength fresh concrete into a bottom of the steel tube, wherein the high-strength fresh concrete has a 20 mm thickness in the bottom of the steel tube after being poured into the steel tube, and then alternately putting the wet demolished concrete lumps and pouring the high-strength fresh concrete into the steel tube, and vibrating the demolished concrete lumps and the high-strength fresh concrete in the steel tube until the steel tube is filled, so that the demolished concrete lumps are distributed in the high-strength fresh concrete.

* * * * *